(12) United States Patent
Moennich et al.

(10) Patent No.: US 8,353,556 B2
(45) Date of Patent: Jan. 15, 2013

(54) SEAT CARRIER ARRANGEMENT AND CONSTRUCTION FOR A BUS

(75) Inventors: Thomas Moennich, Dornstadt (DE); Gregor Steinmetz, Stuttgart (DE)

(73) Assignee: Daimler AG, Stuttgart (DE)

( * ) Notice: Subject to any disclaimer, the term of this patent is extended or adjusted under 35 U.S.C. 154(b) by 238 days.

(21) Appl. No.: 12/602,789

(22) PCT Filed: May 29, 2008

(86) PCT No.: PCT/EP2008/004261
§ 371 (c)(1),
(2), (4) Date: Dec. 3, 2009

(87) PCT Pub. No.: WO2008/151718
PCT Pub. Date: Dec. 18, 2008

(65) Prior Publication Data
US 2010/0176623 A1      Jul. 15, 2010

(30) Foreign Application Priority Data
Jun. 12, 2007  (DE) .......................... 10 2007 026 951

(51) Int. Cl.
*B62D 47/02* (2006.01)
(52) U.S. Cl. ............. 296/187.09; 296/68.1; 296/203.01
(58) Field of Classification Search ............. 296/187.09, 296/187.12, 68.1, 63, 187.08, 64, 190.03, 296/190.7, 193.07, 203.01; 180/271; 280/781
See application file for complete search history.

(56) References Cited

U.S. PATENT DOCUMENTS

| | | | |
|---|---|---|---|
| 6,189,946 B1 * | 2/2001 | Levin | 296/68.1 |
| 6,805,401 B2 * | 10/2004 | Hayashi et al. | 296/204 |
| 7,114,764 B1 * | 10/2006 | Barsoum et al. | 296/193.07 |
| 7,270,045 B1 * | 9/2007 | Gonzalez | 89/36.02 |
| 7,416,243 B2 * | 8/2008 | Dammann et al. | 296/190.03 |
| 7,448,673 B2 * | 11/2008 | Yasuhara | 296/187.09 |
| 2004/0032149 A1 * | 2/2004 | Ljungquist et al. | 296/187.03 |
| 2010/0320800 A1 * | 12/2010 | Minami et al. | 296/187.08 |

FOREIGN PATENT DOCUMENTS

| | | | |
|---|---|---|---|
| JP | 10236342 A | 9/1998 | |
| JP | 10297537 A | 11/1998 | |
| JP | 11170942 A | 6/1999 | |
| WO | 2005102825 A | 11/2005 | |
| WO | 2008047749 A | 4/2008 | |

* cited by examiner

*Primary Examiner* — Glenn Dayoan
*Assistant Examiner* — Pinel Romain
(74) *Attorney, Agent, or Firm* — Patent Central LLC; Stephen A. Pendorf

(57) ABSTRACT

The invention relates to a seat carrier arrangement for a vehicle seat (48) of a utility vehicle, especially a bus, said arrangement comprising a seat carrier (36) supported towards the rear on an energy-absorbing deformation element (52). The seat carrier (36) is embodied as a carrier part of a vehicle structure (10) on the front end of the utility vehicle. The invention also relates to a construction for a utility vehicle, especially a bus, comprising a vehicle structure (10) on the front end, with an upper and a lower absorber plane (12, 14). The invention also relates to at least one front axial bridge (58) of a base frame or a substructure (18) in the region of a front axle formed as a longitudinal deformation element.

11 Claims, 4 Drawing Sheets

SEAT CARRIER ARRANGEMENT AND CONSTRUCTION FOR A BUS

Figure 1:
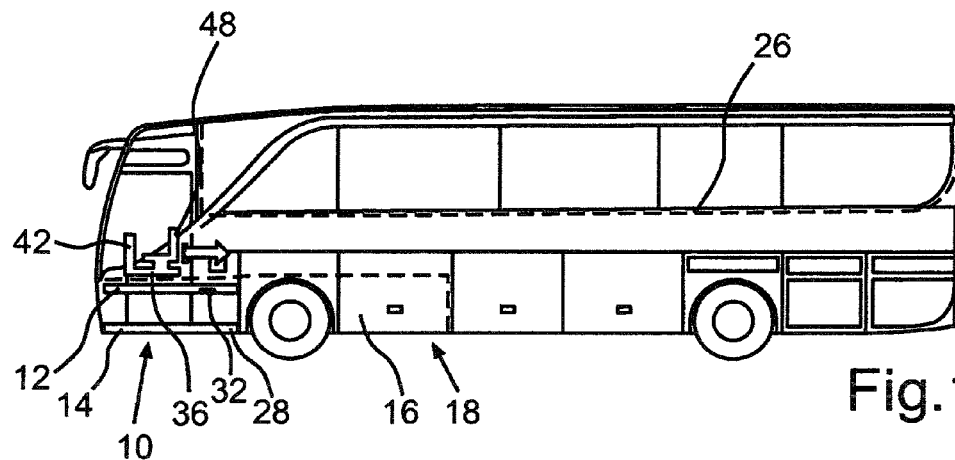

The invention relates to a seat carrier arrangement for a vehicle seat of a utility vehicle, especially a bus. The invention further relates to a construction for a utility vehicle, especially a bus.

Utility vehicles with a forward control construction or motorbuses with a present-day design are distinguished in that the front vehicle seats—for example a driver's seat or passenger seat—are arranged immediately behind a front end wall of the construction. This principally harbors the danger that, in the case of a frontal impact of the utility vehicle or the bus, the survival space for the driver or passenger can be impeded or reduced due to an intrusion of the front end wall possibly taking place. There is furthermore the problem for the driver that a displacement of the steering wheel against the forward direction can also take place with front end intrusion, which entails an additional danger of injury.

Due to this reason, measures have been known for some time for increasing the passive safety especially with a frontal impact, so as to be able to ensure a sufficient survival space of a person positioned behind the front end wall of the utility vehicle or bus. Thereby, the basic problem results that a relatively stiff structure can be created in the front region of the vehicle on the one hand, wherein it has however to be considered with this increase of the stiffness that the seat occupants are not acted upon with an excessive acceleration caused by an accident, which would again be reflected in an increased risk of injury—for example by the so-called whiplash effects.

A principal approach for solving the entire problem is for example already known from DE 28 53 621 A1, which shows a seat carrier arrangement in a utility vehicle, where a seat carrier is supported at an energy-absorbing deformation element. If a front bumper of the utility vehicle is loaded with a force caused by an accident due to a frontal impact, a part of the accident force is initially taken up by a deformation element between the bumper and the front end of the seat carrier. The seat carrier itself is fixed on runners of the underbody by interposition of break-off elements. After the front deformation element has been taken up completely, the break-off elements correspondingly break off from the vehicle frame during the further course of the frontal impact, so that the seat carrier can be displaced along the runners against the forward direction. This displacement path takes place while absorbing energy by means of the further deformation element arranged behind the seat cushion carrier.

However, the fact that this is constructed in a very elaborate manner has to be seen as problematic with this seat carrier arrangement. It is a further disadvantage that the seat carrier is mounted in a displaceable manner above the underbody, wherein the vehicle frame reaching at least approximately the front wall or the bumper cannot be engaged in the energy absorption.

It is thus the object of the present invention to create a seat carrier arrangement and a construction of the above-mentioned type, by means of which the risk of injury of the passengers can be reduced further.

This object is solved according to the invention by a seat carrier arrangement and a construction for a utility vehicle as defined in the claims. Advantageous arrangements with practical and non-trivial further developments of the invention are given in the respective dependent claims.

So as to create a seat carrier arrangement for a vehicle seat of a utility vehicle, especially a bus, with which the risk of injury of the seat occupant can be reduced further in the case of a frontal collision of the utility vehicle or bus, it is provided according to the invention that the seat carrier is formed as a carrier part of a vehicle structure at the front end of the utility vehicle. In other words, it is provided according to the invention to integrate the seat carrier into a vehicle structure at the front end of the utility vehicle. By this, the danger of the seat occupant by intrusions into the front wall at the front end of the motor vehicle can first be reduced, wherein the vehicle seat can be moved against the drive direction and while absorbing energy by means of the deformation element in case of a force application caused by an accident. It is thereby possible to be able to compensate for the loss of survival space at least partially or to a large extent. The risk of injury for the seat occupant can thus be reduced considerably.

It is further possible to achieve a well-adjusted rest structure in a simple manner by the integration of the seat carrier in the vehicle structure into which the seat carrier is integrated. The entire system can thus be designed in an advantageous manner in that the accelerations acting on the respective seat occupant in the case of a force application caused by an accident can be kept as even and small as possible.

By the integration into the vehicle structure, the seat carrier can further be used as a carrier part, which contributes to the stiffening in the normal drive operation. A fundamental difference to the seat carrier arrangement according to DE 28 53 621 A1 results thereby, where such an integration is not provided.

In a further design of the invention, it has been shown to be furthermore advantageous if the seat carrier remains at least essentially dimensionally stable with a force application caused by an accident. By this, a sufficient survival space can be ensured for the seat occupant, so that he can be protected correspondingly during a frontal impact.

In a further design of the invention, the deformation element is formed as a bending and/or torsional carrier, as this can be deformed in an elastically plastic manner in a simple manner and can be produced easily. Furthermore, the advantage results that the deformation progress of such a formation element can be adjusted in a very simple manner.

It has further been shown to be advantageous if the seat carrier has a console for a steering column and/or a pedestal frame for the vehicle seat. By providing such a console, a stiff connection of the steering column can be ensured, so that the steering wheel can only move slightly in the direction of the vehicle seat during a frontal impact.

So as to further create an improved construction for a utility vehicle, especially for a bus, with regard to its deformation properties, it is provided according to the invention that the vehicle structure is formed as a deformation zone comprising an upper and a lower absorber plane. It can be achieved by such a deformation zone that the movement energy of the utility vehicle or the bus can be relieved correspondingly in such a manner that the intrusions and the forces and accelerations acting on the respective seat occupant can correspondingly be minimized or adjusted. By choosing a lower and an upper absorber plane, a desired division can be achieved thereby, wherein the upper absorber plane is activated for example if a collision with a larger or higher vehicle occurs, and the lower absorber plane for example as an underride protection for smaller or lower vehicles.

It is further possible by the construction according to the invention to create an optimum adjustment of the displaceable mounting or arrangement of the seat carrier and the deformation zone formed as crash structure to each other.

In a further design of the invention it has also been shown to be advantageous that the deformation zone extends into a front region of the base frame or substructure of the utility vehicle, but especially the bus. In other words, it has additionally been shown to be advantageous if the deformation zone is not only limited to the lower and upper absorber plane of the front crash structure, but extends further to the rear. An especially well-functioning deformation zone can thus be realized. While the seat carrier does not receive any or only small deformations, these could occur in front thereof, behind it, or next to it.

It has further been shown to be advantageous if the passenger space of the utility vehicle, especially the bus, is formed as a safety passenger cell. In other words, it is particularly advantageous if the passenger space is designed in such a manner that it acts as a safety passenger cell and experiences only small deformations. By this, a sufficient survival space can be ensured for all vehicle occupants in a relatively simple manner.

It has additionally been shown to be advantageous, if at least longitudinal carriers are assigned to the safety passenger cell in the region of a gangway of the bus, which can correspondingly not be deformed in an essential manner.

So as to finally also create an improved construction with regard to its deformation properties for a utility vehicle, especially a bus, it is additionally provided according to the invention that at least one front axial bridge of the base frame or the substructure is formed in the region of a front axle of the utility vehicle as longitudinal deformation elements, which can be deformed due to a force application caused by an accident. While the base frame or the substructure is usually designed in a relatively stiff manner in the known state of the art in the region of the front axle suspension due to the high underbody forces to be introduced, whereby small deformations and high accelerations result in this region during a frontal impact, it is in contrast provided according to the invention to design this region of the base frame or the substructure in such a manner that, in the case of an accident or a force application caused by an accident, a defined longitudinal deformation can also take place here. For this reason, it is provided according to the invention to design the respective lateral front axial bridges provided in the region of the front axle suspension in a correspondingly deformable manner.

In a further design of the invention, the respective front axial bridge can thereby be deformed by folding dents and/or folding/bending, so as to achieve a shortening of the length while absorbing impact energy.

It has finally been shown to be also advantageous if the front axial bridge respectively has two side walls which are deformed due to a force application caused by an accident. A corresponding deformation element can be reproduced in a simple manner by these side walls.

Figure 2:
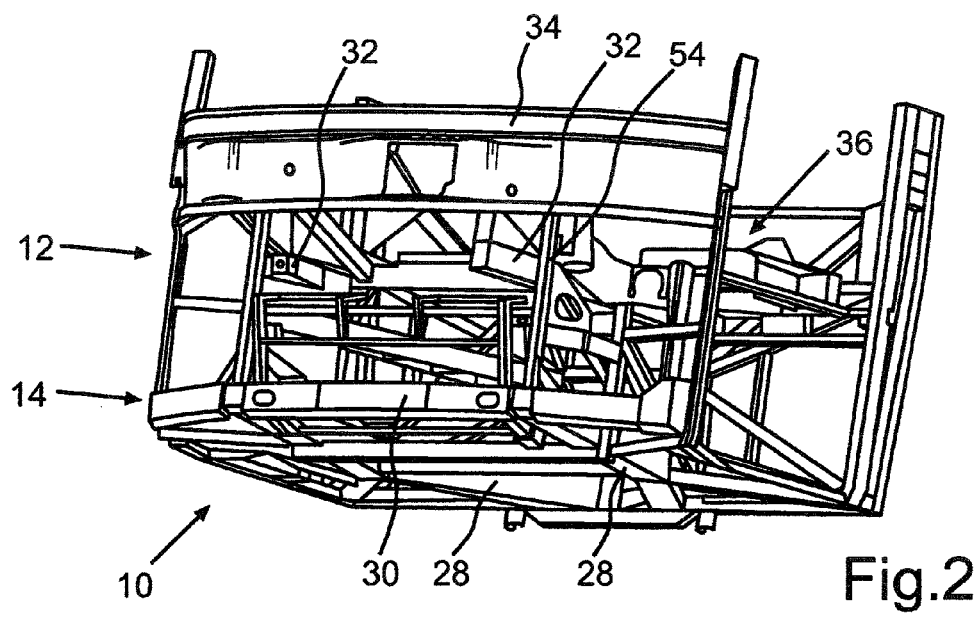
Figure 3:
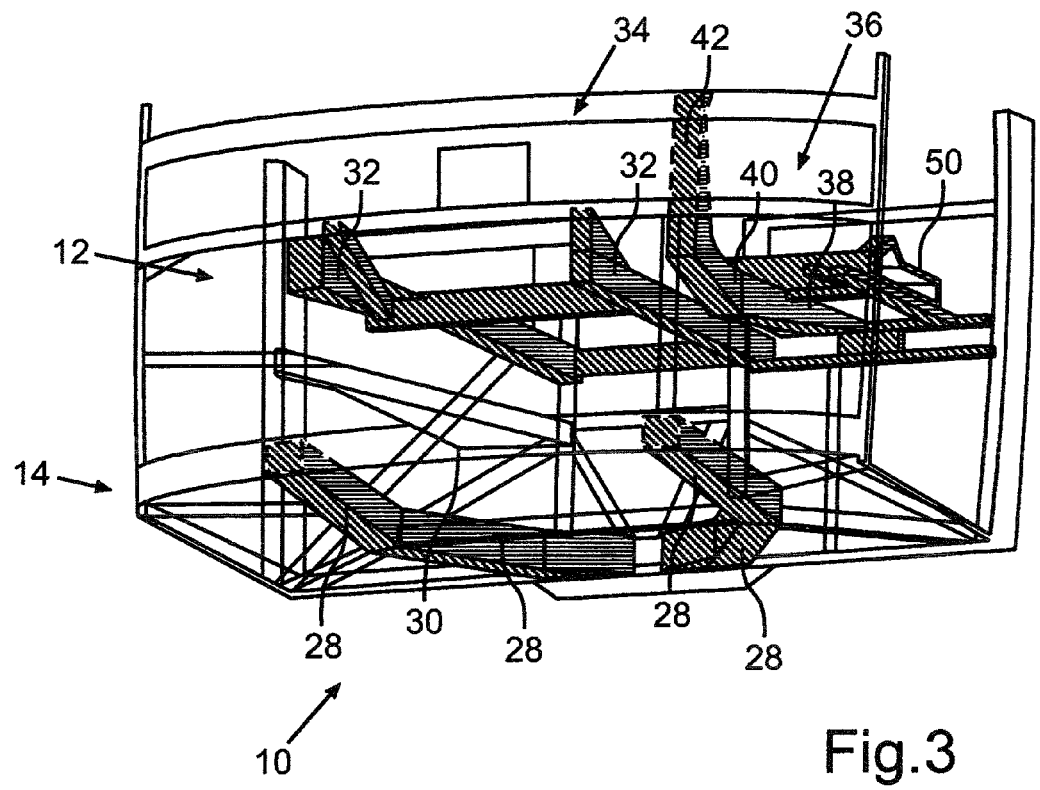
Figure 4:
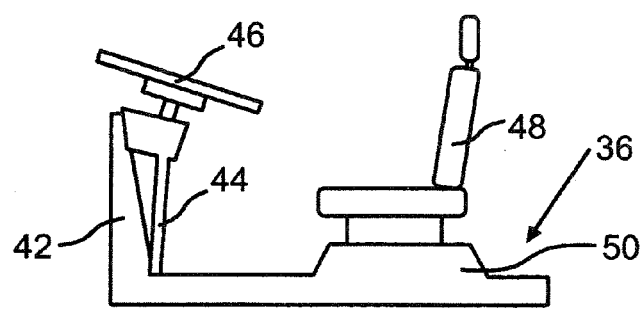
Figure 5:
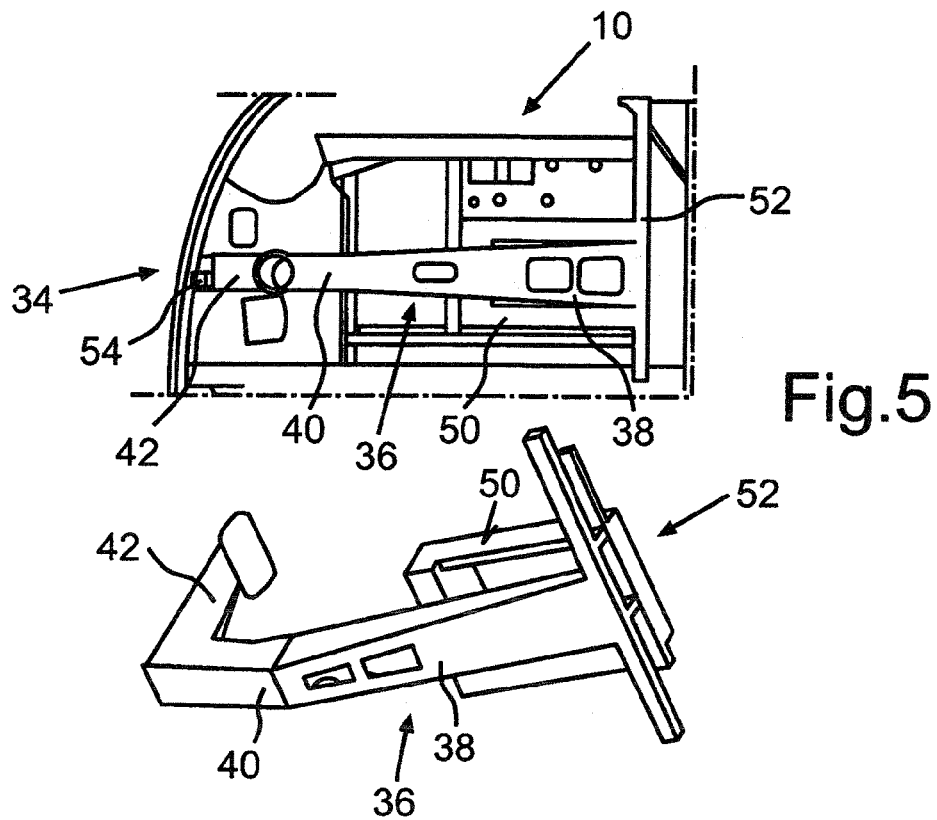
Figure 6:
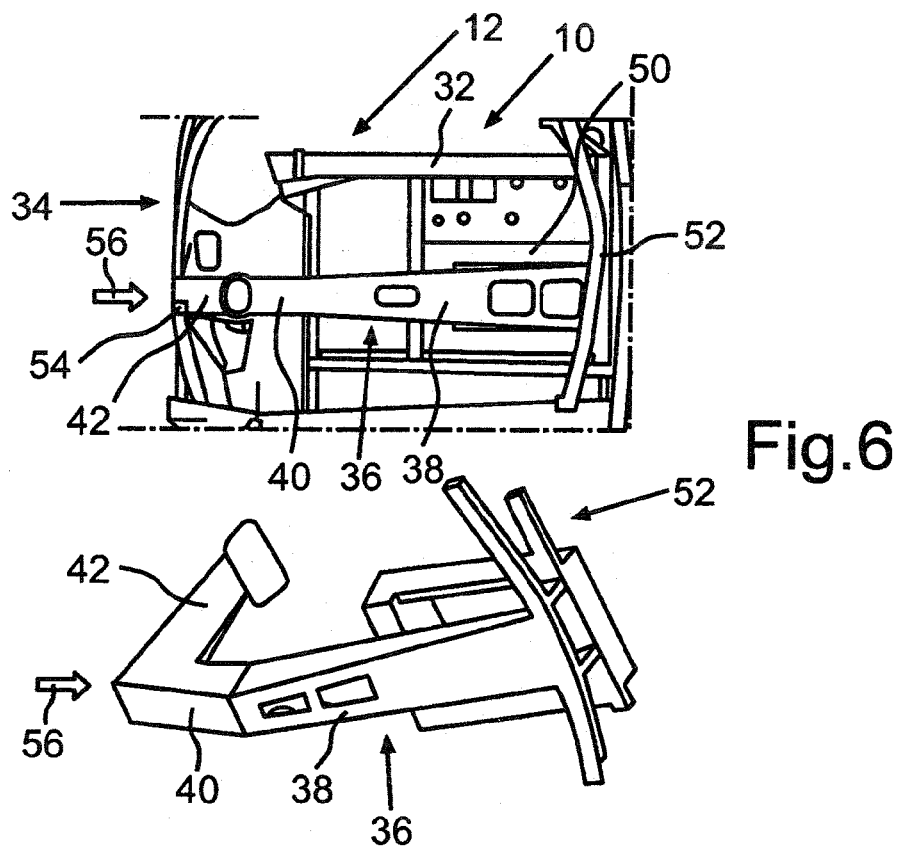
Figure 7:
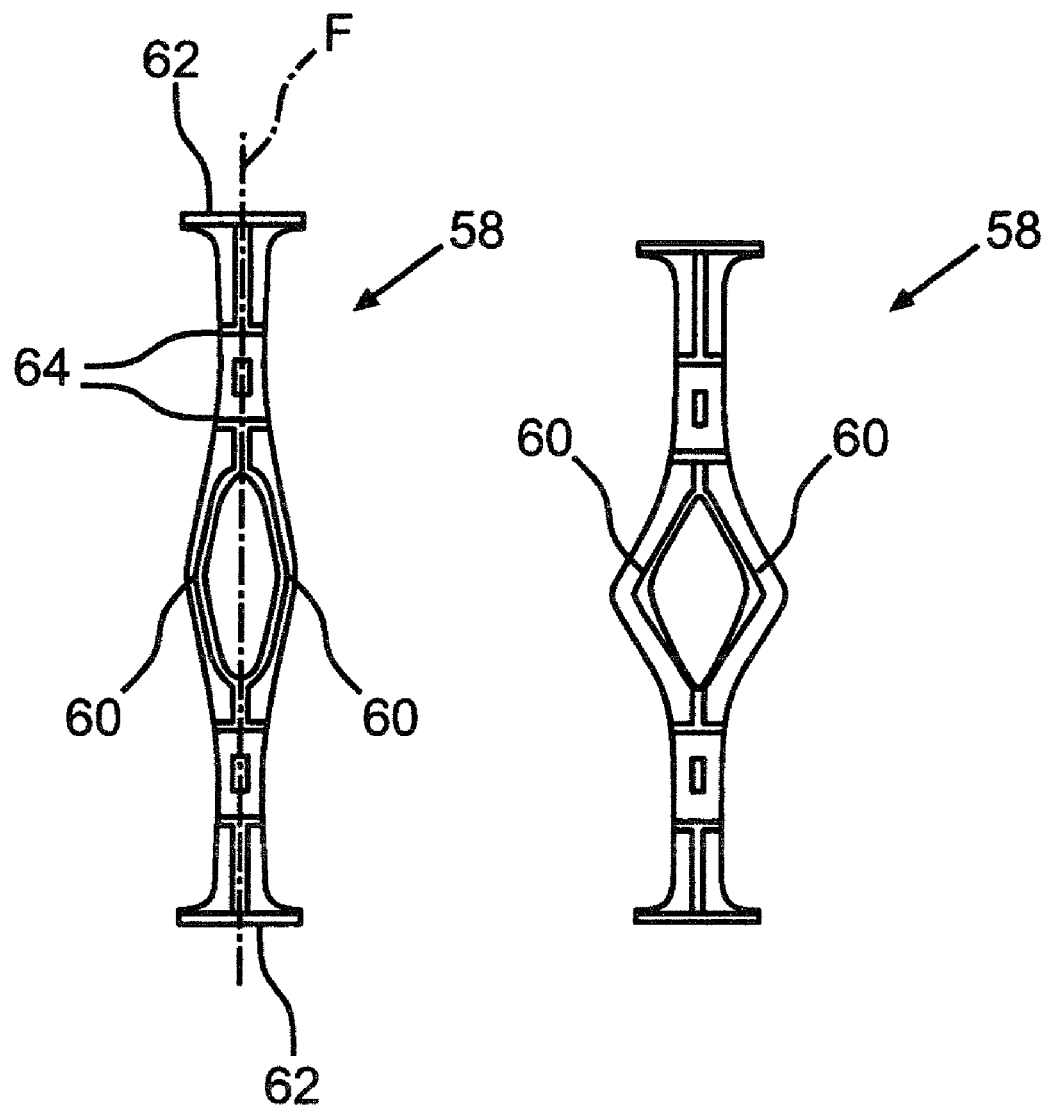

Further advantages, characteristics and details of the invention result from the following descriptions of individual embodiments and by means of the drawings; these show in:

FIG. 1 a schematic side view of a bus, which comprises a front vehicle or a crash structure with a lower and an upper absorber plane, which extends to a front region of a base frame or substructure of the bus to about over half the length of the bus, wherein a seat carrier arrangement with a seat carrier can be seen in the region of the crash structure, which carrier is to be moved backwards during a force application caused by an accident due to a front impact against the forward drive direction and while absorbing impact energy by means of a deformation element, and wherein at least one front axial bridge of the base frame or of the substructure is formed as a longitudinal deformation element, which can be deformed due to a force application caused by an accident;

FIG. 2 a schematic view and which is perspective in parts of the front vehicle or crash structure of the bus, seen below from the front in an oblique manner, wherein the seat carrier arrangement on the driver side can be seen next to the lower and upper absorber plane;

FIG. 3 a further schematic view and which is perspective in parts of the front vehicle or crash structure analogous to FIG. 3, seen below from the front in an oblique manner;

FIG. 4 a schematic side view and which is shown in parts of the seat carrier arrangement according to FIGS. 2 and 3;

FIG. 5 respectively a schematic bottom view and a perspective bottom view of the seat carrier of the seat carrier arrangement in the undeformed state;

FIG. 6 respectively a schematic bottom view and a perspective bottom view of the seat carrier of the seat carrier arrangement in the deformed state of the vehicle or crash structure; and in FIG. 7 respectively a schematic top view of one of the two front axial bridges of the base frame or of the substructure formed as longitudinal deformation elements in the undeformed and the deformed state, which this adopts due to a force application caused by an accident.

In FIG. 1 is shown a bus in a schematic view, at the front end of which is provided, viewed together with FIGS. 2 and 3, a vehicle structure 10 in the form of a crash structure, which comprises an upper and a lower absorber plane 12, 14. The front vehicle structure 10 thereby forms a deformation zone 16, which extends into the region of a substructure 18 or base frame of the bus arranged behind the vehicle structure 10. In other words, not only the front vehicle structure 10 is presently formed as an energy-absorbing crash structure, but at least also a front region of the substructure 18. The deformation zone 16 is thereby indicated with dashed lines and extends up to about half the length of the bus.

It can further be seen that, in the region of the front vehicle structure 10, a seat carrier arrangement of a seat carrier 36 is provided, which will be explained further especially with reference to FIGS. 4, 5 and 6, which presently carries a vehicle seat 48 formed as a driver's seat. The seat carrier 36 is thereby supported to the rear by a deformation element, which will be explained further especially with reference to FIGS. 5 and 6, and can thus be displaced against the forward drive direction in the case of a force application caused by an accident due to a frontal impact of the bus—as indicated with the arrow 24 in FIG. 1. The passenger space of the bus is—as indicated by the dashed line 26—formed as a safety passenger cell in the present case, which only experiences a small deformation during an impact, especially a frontal impact. This can for example be achieved in that at least longitudinal carriers are assigned to the safety passenger cell in the region of a central gangway of the bus.

Finally, it can be seen in FIG. 1 that the base frame or substructure 18 comprises at least a front axial bridge in the region of the of the front axle suspension, whose concrete design will be explained in more detail especially in connection with FIG. 7. The region of the substructure 18, to which the lower suspension arms of the front axle suspension are fastened, are thereby named as the respective front axial bridge 58. The front axial bridge 58 is thereby presently integrated for example into the corresponding frame carriers of the base frame or substructure 18.

From FIGS. 2 and 3, which show the front vehicle structure 10 in parts and in a schematic perspective view, seen below from the front in an oblique manner, the upper and the lower absorber plane 12, 14 can be seen. The lower absorber plane 14 thereby comprises a plurality of carriers 28 arranged angularly to one another, which connect to a transverse carrier 30 towards the front. The lower absorber plane 14 thus serves especially as an underride protection during a frontal collision with smaller and lower vehicles such as passenger motor vehicles. The upper absorber plane 12 also comprises a plurality of carriers 32, also arranged angularly to one another, which are arranged with a height distance to the carriers 28 of the lower absorber plane 14. The upper absorber plane 12 is thereby especially activated during a collision with vehicles which are built higher (SUV, small transporter, utility vehicle). From FIGS. 2 and 3, the front end 34 of the vehicle structure 10 can further be seen, along which extends a front end wall of the bus, not shown. The used carriers 28 or 32 are presently formed as longitudinal carriers, which fail in the case of a collision by folding dents. Instead of a design where a failure takes place by folding dents, the carriers 28 or 32 can also be formed in a different manner for absorbing energy. In the present case, it is additionally advantageous that the deformation zone 16 is not restricted to the region of the absorber planes 14, but that also the base frame and the substructure 18 behind it can be deformed in a specific manner.

In such a same manner, the longitudinal carriers of the deformation zone 16 (FIG. 1) arranged behind can be designed to be able to provide a further improved energy absorption ability of the bus. It is obvious that not only carriers 28, 32 formed as longitudinal carriers are used as alternative versions for the absorber elements 12, 14, but that in principal all energy-absorbing designs are feasible. It can be seen altogether that a vehicle structure 10 is created presently, which can absorb the movement energy of the vehicle in such a manner that the intrusions and the accelerations acting on the seat occupants are minimized.

Furthermore, a seat carrier arrangement on the driver side can be seen in FIGS. 2 and 3, which shall be explained especially together with the further FIGS. 4 to 6. For this, FIG. 4 shows a schematic side view and in parts of the seat carrier arrangement. FIGS. 5 and 6 show the seat carrier arrangement or a seat carrier 36 in respectively a schematic view from below and respectively a prespective view from below before or after a force application of the front vehicle structure 10 caused by an accident due to a frontal collision of the bus.

In viewing FIGS. 4 and 6 together, it can first be seen that the seat carrier 36 comprises two carrier parts 38, 40 connected to one another, which are connected to one another in a slightly angular manner. The two carrier parts 38, 40 of the seat carrier 36 extend altogether in the longitudinal direction of the vehicle (x-direction). Furthermore, the seat carrier 36 comprises a console 42 for a steering column 44, which essentially extends in the vertical vehicle direction (z direction) and is fixedly connected to the carrier parts 38, 40. The stiff connection of the console 42 or the steering column 44 to the seat carrier 36 ensures that a steering wheel 46 can only move slightly in the direction of the vehicle seat 48 during a frontal impact. The vehicle seat 48 is carried by a pedestal frame 50, which is connected to the carrier parts 38, 40 of the seat carrier 36 with interposition of a bending and/or torsional carrier 52.

The seat carrier 36 is—as can especially seen in FIGS. 2, 3 and 5—, integrated into the vehicle structure as a carrier part 10. In other words, the seat carrier 36 thus also takes on a carrier function for the crash structure. The seat carrier 36 is thereby fixed at its front end in the region of a profile 54 proceeding in the vertical direction. The seat carrier 36 is supported at the rear end of the vehicle structure 10 via the bending and/or torsional carrier 52 towards the rear. The seat carrier 36 thereby extends approximately at the height of the upper absorber plane 12. It can thus be seen that a simply designed seat carrier 36 is created presently, which is integrated into the vehicle structure in an extremely simple manner and contributes to its stiffness.

It can be seen especially from FIG. 6, in which manner the vehicle structure 10 or the seat carrier 36 behaves during a force application (arrow 56) caused by an accident due to a frontal impact of the bus. It can be seen especially, that the seat carrier 36 or its carrier parts 38, 40 remain essentially undeformed or dimensionally stable. The bending or torsional carrier 52 is deformed from its form shown in FIG. 5 to the form in FIG. 6 by the force application caused by an accident. In other words, a displaceable mounting or displacement of the seat carrier takes place presently, wherein this is mounted or held in the vehicle structure 10 by the deformable bending or torsional carrier 52. The forces acting on the seat carrier 36 or the carrier parts 38, 40 during the impact lead to an elastically plastic deformation of the components of the bending and/or torsional carrier 52. The longitudinal displacement of the seat carrier 36 is thereby realized by the superposition of bending and torsion of the bending and/or torsional carrier 52 formed as a rectangular profile. Possible versions are however also longitudinal displacements resulting from pure bending or a torsion.

The vehicle structure 10 or the seat carrier arrangement of the seat carrier 36 is designed in such a manner that its acceleration progress affects the biomechanical load of the seat occupant in a favorable manner. If the seat carrier 36 comes into contact with adjacent structures or components during the displacement process, their force displacement behavior can likewise be used for influencing the acceleration progress. Furthermore, the deformable elements have to be dimensioned in such a manner that all loads occurring in the normal drive operation to not lead to an intended displacement or shifting of the seat carrier 36. The seat carrier 36 consequently contributes to the stiffening of the vehicle structure.

From FIG. 6 it can be seen additionally that a survival space for the seat occupant between the steering wheel 46 and the vehicle seat 48 is to be ensured by the stiff arrangement of the console 42 or the longitudinal column 44.

It is thus possible with the seat carrier arrangement according to the invention to counteract an intrusion occurring in the region of the front end wall of the bus, in that the seat carrier 36 can be displaced correspondingly to the rear—while absorbing impact energy. In the same manner, an absorption of the impact energy is achieved by the vehicle structure 10 or the absorber planes 12 and 14. By a suitable adjustment of the position, geometry and deformation properties of the described components, it is ensured thereby that the accelerations acting on the seat occupant will not be excessively high.

A three-point seat belt, not shown, can presently especially be assigned to the vehicle seat 48, wherein all belt fastening points are fastened to the vehicle seat 48 or the seat carrier 36.

It can thus be seen altogether that a simple system is created, especially also by the bending and torsional carrier 52, which system functions purely mechanical and whose susceptibility to failure is reduced to a minimum. It is to be viewed to be within the scope of the invention, that, instead of the driver's seat provided here, a passenger seat can also be provided with a corresponding seat carrier arrangement. It is also to be viewed to be within the scope of the invention that the used seat carrier arrangement or the described construction of the bus can also be used with a forward control vehicle.

The entire construction of the bus is thereby especially characterized in that not only the front seat occupants near the front end wall are protected correspondingly, but also the passengers sitting within the passenger cell.

In FIG. 7, the front axial bridge 58 formed as a longitudinal deformation element is respectively shown in a schematic top view, which bridge is integrated into respective frame carriers as part of the base frame or substructure 18, and shown on the left in the undeformed state and on the right in the deformed state, which this adopts due to a force application caused by an accident. It can be seen thereby that the front axial bridge 58 comprises two flanges 62, by means of which it can be fitted into the base frame or substructure 18. It can further be seen that the front axial bridge comprises two side walls 60, which enclose an essentially O-shaped opening. When viewing the two illustrations according to FIG. 7 together, it can be seen that the side walls 60 can be deformed due to a force application caused by an accident—while absorbing energy. Such a deformation can presently take place by folding dents of the axially loaded carrier elements of the substructure and/or by folding/bending the carrier elements of the substructure—in the present case especially the side walls 60. It is achieved thereby, that the previously conventional relative stiff region of the base frame or subframe 18 can now be consulted for the longitudinal deformation. The side walls 60 are thereby caused to folding dents or by folding/bending when a certain longitudinal force is exceeded. This is presently achieved in that the side walls 60 already have a curvature in the normal state. The functionality of the front axial bridge 58 is thereby not affected in the normal drive operation—that is, with a front axial bridge 58b which is not deformed.

It can be seen that the deformation and the energy absorption can thus be distributed evenly over the entire deformation zone 16. A limitation of the acceleration values for the occupants and a limitation of the deformation in the case of a frontal impact results hereby on a smaller region, which influences the repair costs in a especially advantageous manner.

Finally, in FIG. 7 can be seen fastening points 64 for lower suspension arms. The vehicle center is also indicated by the dot-dash line F.

The invention claimed is:

1. A seat carrier arrangement for a vehicle seat (48) of a utility vehicle, wherein said utility vehicle comprises:
    a base frame (18),
    a vehicle structure (10) on the front end of the utility vehicle and forward of the base frame (18), the vehicle structure (10) forming a deformation zone and comprising an upper and a lower absorber plane (12, 14),
    a seat carrier (36), which is supported towards the rear on an energy-absorbing deformation element (52), wherein the seat carrier (36) is integrated in the vehicle structure (10),
    wherein, responsive to application of force introduced by a frontal accident to the vehicle structure (10):
    the integrated seat carrier (36) moves horizontally against the drive direction,
    the energy-absorbing deformation element (52) deforms while absorbing energy, and
    the seat carrier (36) remains at least essentially dimensionally stable during force application caused by the accident, and
    wherein the deformation element is at least one of a bending and a torsional carrier (52).

2. A seat carrier arrangement for a vehicle seat (48) of a utility vehicle, wherein said utility vehicle comprises:
    a base frame (18),
    a vehicle structure (10) on the front end of the utility vehicle and forward of the base frame (18), the vehicle structure (10) forming a deformation zone and comprising an upper and a lower absorber plane (12, 14),
    a seat carrier (36), which is supported towards the rear on an energy-absorbing deformation element (52), wherein the seat carrier (36) is integrated in the vehicle structure (10,
    wherein the seat carrier (36) has a console (42) for a steering column (44), and
    wherein, responsive to application of force introduced by a frontal accident to the vehicle structure (10):
    the integrated seat carrier (36) including console (42) moves horizontally against the drive direction,
    the energy-absorbing deformation element (52) deforms while absorbing energy, and
    the seat carrier (36) including console (42) remains at least essentially dimensionally stable during force application caused by the accident.

3. A seat carrier arrangement for a vehicle seat (48) of a utility vehicle, wherein said utility vehicle comprises:
    a base frame (18),
    a vehicle structure (10) on the front end of the utility vehicle and forward of the base frame (18), the vehicle structure (10) forming a deformation zone and comprising an upper and a lower absorber plane (12, 14),
    a seat carrier (36), which is supported towards the rear on an energy-absorbing deformation element (52), wherein the seat carrier (36) is integrated in the vehicle structure (10),
    wherein, responsive to application of force introduced by a frontal accident to the vehicle structure (10):
    the integrated seat carrier (36) moves horizontally against the drive direction,
    the energy-absorbing deformation element (52) deforms while absorbing energy, and
    the seat carrier (36) remains at least essentially dimensionally stable during force application caused by the accident, and
    wherein the deformation zone (16) extends into a front region of the base frame (18) of the utility vehicle.

4. A seat carrier arrangement for a vehicle seat (48) of a utility vehicle, wherein said utility vehicle comprises:
    a base frame (18),
    a vehicle structure (10) on the front end of the utility vehicle and forward of the base frame (18), the vehicle structure (10) forming a deformation zone and comprising an upper and a lower absorber plane (12, 14),
    a seat carrier (36), which is supported towards the rear on an energy-absorbing deformation element (52), wherein the seat carrier (36) is integrated in the vehicle structure (10),
    wherein, responsive to application of force introduced by a frontal accident to the vehicle structure (10):
    the integrated seat carrier (36) moves horizontally against the drive direction,
    the energy-absorbing deformation element (52) deforms while absorbing energy, and
    the seat carrier (36) remains at least essentially dimensionally stable during force application caused by the accident, and
    wherein the occupant space of the utility vehicle is formed as a safety occupant cell, and wherein the utility vehicle is a bus.

5. A construction for a utility vehicle, with a vehicle structure (10) arranged in front of a base frame (18), wherein the vehicle structure (10) is formed as a deformation zone comprising an upper and a lower absorber plane (12, 14), wherein the occupant space of the utility vehicle is formed as a safety occupant cell, wherein the utility vehicle is a bus, and wherein at least longitudinal carriers are assigned to the safety occupant cell in the region of a gangway of the bus.

6. A construction for a utility vehicle, with a vehicle structure (10) arranged in front of a base frame (18), and with at least one front axial bridge (58) of the base frame (18) in the region of a front axle of the utility vehicle wherein the front axial bridge (58) of the base frame (18) is formed as a longitudinal deformation element, which can be deformed due to a force application caused by an accident.

7. The construction according to claim 6, wherein the front axial bridge (58) can be deformed by folding dents or by folding/bending.

8. The construction according to claim 6, wherein the front axial bridge (58) respectively has two side walls (60), which can be deformed due to a force application caused by an accident.

9. The seat carrier arrangement according to claim 1, wherein the utility vehicle is a bus.

10. The construction according to claim 6, wherein the utility vehicle is a bus.

11. The seat carrier arrangement according to claim 2, wherein the seat carrier (36) has a pedestal frame (50) for the vehicle seat (48).

* * * * *